United States Patent [19]

Odagi et al.

[11] Patent Number: 5,101,923
[45] Date of Patent: Apr. 7, 1992

[54] MOTORCYCLE HAVING BODY HEIGHT ADJUSTING MECHANISM

[75] Inventors: Shigeru Odagi; Sadao Shirasagi; Masayoshi Matsumoto; Taiji Kasuya; Katsuhiko Tokunaga, all of Hamamatsu, Japan

[73] Assignee: Suzuki Kabushiki Kaisha, Japan

[21] Appl. No.: 612,533

[22] Filed: Nov. 13, 1990

[30] Foreign Application Priority Data

Nov. 10, 1989 [JP] Japan ............................ 1-130546[U]
Nov. 29, 1989 [JP] Japan ............................ 1-307412
Apr. 25, 1990 [JP] Japan ............................ 2-107637

[51] Int. Cl.⁵ .................. B60G 17/00; B62J 39/00; B62K 11/00
[52] U.S. Cl. .................................. 180/219; 280/707; 280/840
[58] Field of Search ............... 180/219, 227; 280/275, 280/276, 707, 840

[56] References Cited

U.S. PATENT DOCUMENTS

| | | | |
|---|---|---|---|
| 4,212,484 | 7/1980 | Fujii | 280/707 |
| 4,422,661 | 12/1983 | Kawamura | 280/707 |
| 4,568,101 | 2/1988 | Bleustein et al. | 280/707 |
| 4,815,758 | 3/1989 | Yoshida | 280/840 |

FOREIGN PATENT DOCUMENTS

| | | | |
|---|---|---|---|
| 3930966 | 3/1990 | German Democratic Rep. | 180/219 |
| 195194 | 8/1989 | Japan | 180/219 |

Primary Examiner—Mitchell J. Hill
Attorney, Agent, or Firm—Bruce L. Adams; Van C. Wilks

[57] ABSTRACT

A motorcycle is provided with a body height adjustor capable of adjusting the body height of the motorcycle by changing lengths of front suspensions and a rear cushion unit. The body height adjustor includes a first hydraulic jack for extending and retracting the front suspensions, a second hydraulic jack for extending and retracting the rear cushion unit and a body height adjusting unit to transmit hydraulic pressure of hydraulic fluid in the rear cushion unit to the first and second hydraulic jacks through hydraulic hoses. The rear cushion unit is provided with a rear oil damper and a coil spring against which the second hydraulic jack abuts and the initial load of the coil spring is changed by the hydraulic pressure in the rear cushion unit. The second hydraulic jack is movable in a direction towards the coil spring with respect to the rear oil damper to change the initial load of the spring. The first hydraulic jack is provided with a cylinder chamber, a piston incorporated in the cylinder chamber and a spring disposed between an end portion of the cylinder chamber and the piston so as to urge the piston in a direction opposite to a direction of hydraulic pressure.

7 Claims, 8 Drawing Sheets

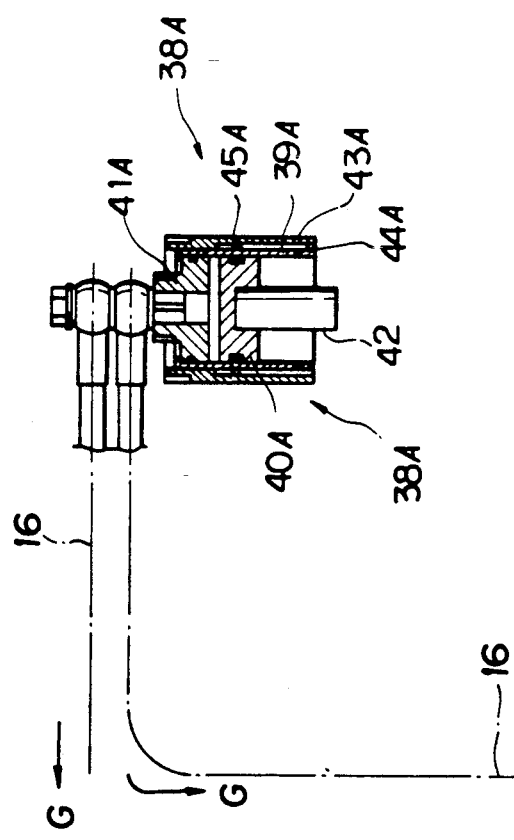
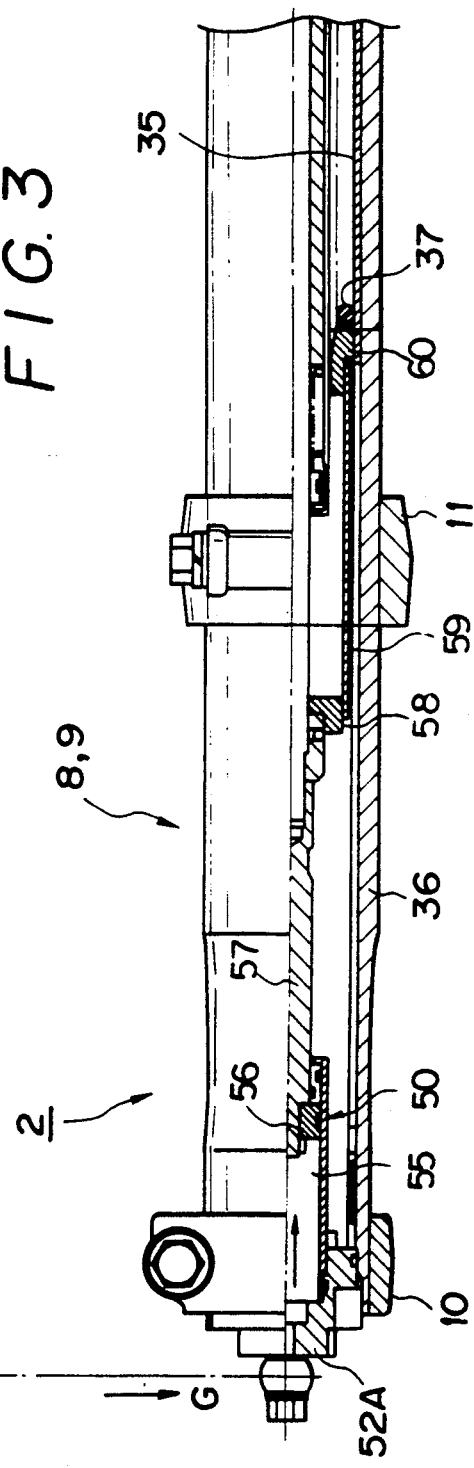
FIG.3

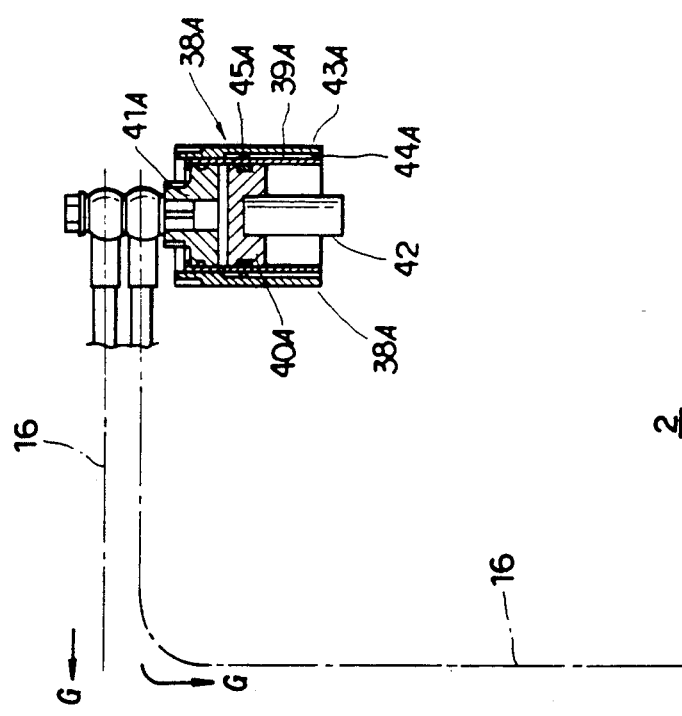
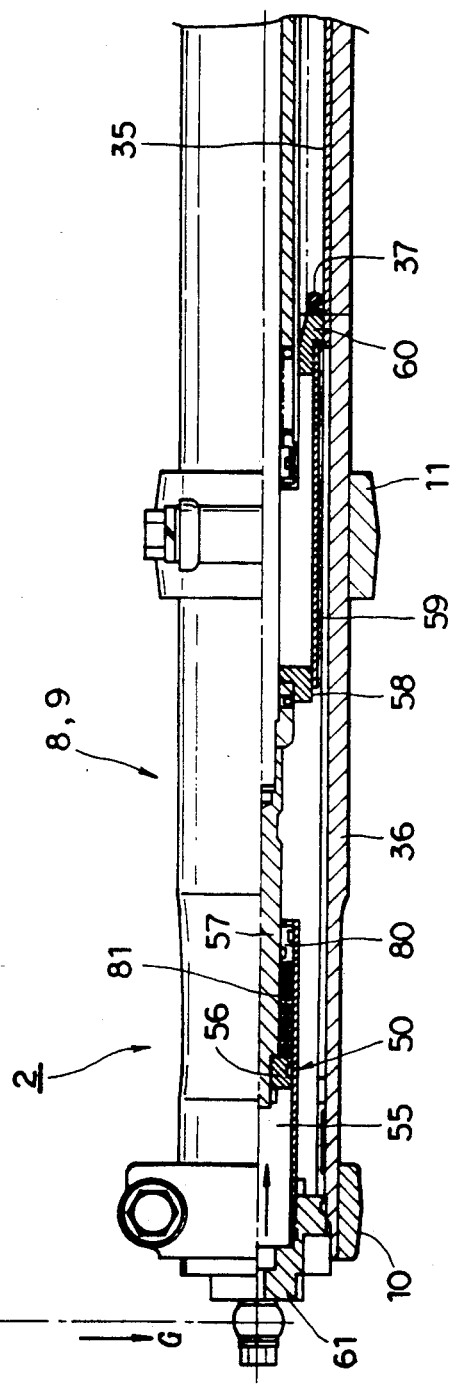
FIG.8

MOTORCYCLE HAVING BODY HEIGHT ADJUSTING MECHANISM

BACKGROUND OF THE INVENTION

This invention relates to a motorcycle provided with a body height adjusting mechanism for adjusting the body height of the motorcycle by changing the lengths of front suspensions and a rear cushion unit.

A motorcycle is provided with a body height adjustor with which the rider can change the height of the body of the motorcycle by using front suspensions and a rear cushion unit.

The height adjustor includes hydraulic hoses used for connection between front suspensions and a body height adjusting unit and between the body height adjusting unit and a rear cushion unit, and hydraulic fluid, i.e. pressure oil, is supplied to o discharged from hydraulic jacks of the front suspensions and the rear cushion unit through the hydraulic hoses to simultaneously change the lengths of the front suspensions and the rear cushion unit.

However, in a case where the body height at the front and rear portions is changed by simultaneously changing the lengths of the front suspensions and the rear cushion unit, there is a fear of inclining upwardly the radiation angle of a head lamp attached to the front fork or inclining the radiation angle excessively downwardly.

In another aspect, in a case where the body height adjustor of the prior art of the character described above is applied to a motorcycle, the body height is set to a high position or a low position by changing a body height changing valve to a high or low side. However, a most suitable position of the body height is determined by the individual attitudes of riders, for example. Namely, in the determination of the low position of the body height, it is difficult to determine a suitable position for the riders having various personal body sizes or attitudes. To date, there has not been proposed a motorcycle having a body height adjusting mechanism solving the above matter.

In the connection described above, when it is required to position the body height to the low position, a body height adjusting unit is operated so as not to excessively apply hydraulic pressure of hydraulic fluid to hydraulic jacks of the front suspensions and the rear cushion unit. The hydraulic fluid in the hydraulic jacks is discharged by the weight of the motorcycle itself and the weight of the rider. However, in this case, since a small quantity of hydraulic pressure is applied to the hydraulic jacks of the front suspensions and the rear cushion unit, there is a danger of extending the front suspensions in a case where a load to be distributed to a front wheel is made extremely small, such as in a case where the front wheel is apart from a road in a certain reason.

SUMMARY OF THE INVENTION

An object of this invention is to substantially eliminate defects or drawbacks encountered in the prior art and to provide a motorcycle having a body height adjustor capable of accurately adjusting the body height by changing the lengths of the front suspensions and the rear cushion unit.

Another object of this invention is to provide a motorcycle having a body height adjustor capable of suppressing the variation of an irradiation angle of a head lamp by setting the irradiation center to a suitable allowable range at a time when the front and rear wheels are simultaneously adjusted in height, for example.

A further object of this invention is to provide a motorcycle having a body height adjustor capable of preventing an unnecessary extension of the front suspensions even if the load is distributed to the front wheel in the: low state of the body height.

These and other objects can be achieved according to this invention, in one aspect, by providing a motorcycle having a body adjustable in height comprising a pair of front suspensions mounted to a front fork supported rotatably by a frame of a motorcycle body, the front fork supporting a front wheel in a shock absorbing manner, the front fork being equipped with a head lamp, a rear cushion unit supported by the body frame, the rear cushion unit supporting a rear wheel in a shock absorbing manner, an engine unit mounted to the body frame to drive and rotate the rear wheel and a body height adjustor capable of adjusting the body height of the motorcycle by changing lengths of the front suspensions and the rear cushion unit, the body height adjustor including a first hydraulic jack provided for the front suspensions, a second hydraulic jack provided for the rear cushion unit and a body height adjusting unit adapted to transmit hydraulic pressure of hydraulic fluid in the rear cushion unit to the first and second hydraulic jacks through hydraulic hoses to thereby change the body height in a high or low position thereof, wherein a following equation is satisfied, $$X \leq LH/5 \times 10$$

where
X: difference between stroke changing quantities on an axis of the front wheel and an axis of the rear wheel;
L: distance between axes of the front and rear wheels, so called wheel base;
H: height of the head lamp from a ground base.

In another aspect of this invention, there is provided a motorcycle having a body adjustable in height comprising a pair of front suspensions mounted to a front fork supported rotatably by a frame of a motorcycle body, the front fork supporting a front wheel in a shock absorbing manner, a rear cushion unit supported by the body frame, the rear cushion unit supporting a rear wheel in a shock absorbing manner, an engine unit mounted to the body frame to drive and rotate the rear wheel and a body height adjustor capable of adjusting the body height of the motorcycle by changing lengths of the front suspensions and the rear cushion unit, the body height adjustor including a first hydraulic jack provided for the front suspensions, a second hydraulic jack provided for said rear cushion unit and a body height adjusting unit adapted to transmit hydraulic pressure of hydraulic fluid in the rear cushion unit to the first and second hydraulic jacks through hydraulic hoses, the rear cushion unit being provided with a rear oil damper having an outer periphery to which the second hydraulic jack is mounted and provided with a spring means against which the second hydraulic jack abuts, the spring means having an initial load changed by hydraulic pressure of the hydraulic fluid in the rear cushion unit and the second hydraulic jack being movable in a direction towards the spring means with respect to the rear oil damper to change the initial load of the spring means.

In a further aspect of this invention, there is provided a motorcycle having a body adjustable in height comprising a pair of front suspensions mounted to a front fork supported rotatably by a frame of a motorcycle body, the front fork supporting a front wheel in a shock absorbing manner, a rear cushion unit supported by the body frame, the rear cushion unit supporting a rear wheel in a shock absorbing manner, an engine unit mounted to the body frame to drive and rotate the rear wheel and a body height adjustor capable of adjusting the body height of the motorcycle by changing lengths of the front suspensions and the rear cushion unit, the body height adjustor including a first hydraulic jack provided for the front suspensions, a second hydraulic jack provided for said rear cushion unit and a body height adjusting unit adapted to transmit hydraulic pressure of hydraulic fluid in the rear cushion unit to the first and second hydraulic jacks through hydraulic hoses, the first hydraulic jack being provided with a cylinder chamber, a piston incorporated in the cylinder chamber and a spring force urging member disposed between an end portion of the cylinder chamber and the piston so as to urge the piston in a direction opposite to a direction of the hydraulic pressure applied by the hydraulic fluid.

According to one aspect of this invention, the irradiation central position of the head lamp can be set in an allowable range even in both the high and low positions of the motorcycle by setting suitably diameters of the hydraulic jacks for the front suspensions and the rear cushion unit.

In another aspect of this invention, the hydraulic jack of the rear cushion unit applies the initial load to the coil spring by the hydraulic pressure of the hydraulic fluid and, in addition, such initial load can be applied by the movement thereof in the direction of the coil spring with respect to the rear damper. Accordingly, the length of the rear cushion unit can be finely adjusted by minutely moving the rear hydraulic jack with respect to the rear damper after changing the length thereof by the hydraulic pressure. Consequently, the minute control of the body height is made possible, thus being suitable for the riders having various foot lengths or attitudes.

In a further aspect of this invention, when the body height adjustor is operated to change the body height to the high position thereof, a large hydraulic pressure of the hydraulic fluid is transmitted to the hydraulic jack of the front suspensions. This hydraulic pressure presses the jack piston against the urging force of the spring member to increase the initial load of the spring of the front suspensions to expand the same, thus changing the body height to the high position.

When the body height adjustor is operated to change the body height to the low position thereof, the hydraulic pressure to be transmitted to the hydraulic jack of the front suspensions is reduced, so that the jack piston of the hydraulic jack is forced backwardly by the spring urging force and the weights of the motorcycle body and the rider. Consequently, the initial load of the spring of the front suspensions is lowered to thereby contract the same, thus changing the body height to the low position.

BRIEF DESCRIPTION OF THE DRAWINGS

For a better understanding of this invention and to show how the same is carried out, reference is now made, by way of preferred embodiments, to the accompanying drawings, in which:

FIG. 3 is a cross sectional view of the front suspensions of FIG. 1 together with associated members;

FIG. 8 is a view of a modified embodiment similar to that of FIG. 3; and

DESCRIPTION OF THE PREFERRED EMBODIMENTS

One embodiment of the present invention will be described below with reference to the accompanying drawings.

Figure 1:
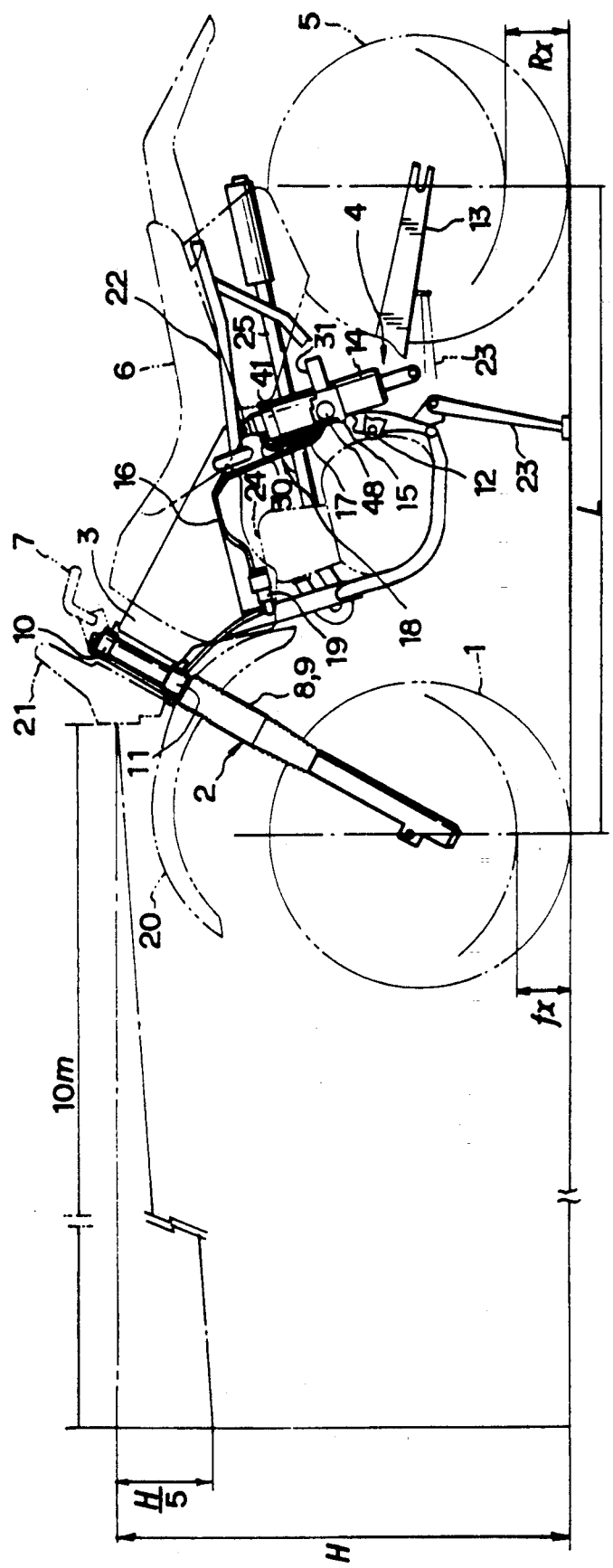
FIG. 1 is a side view of the whole of a motorcycle to which a motorcycle body height adjustor according to this invention is applied.

FIG. 1 is a side view of the whole of a motorcycle to which a motorcycle body height adjustor in accordance with the present invention is applied.

As shown in FIG. 1, a front fork 2 for supporting a front wheel 1 is disposed in front of a body frame 3, and a rear wheel 5 supported by a rear suspension 4 is disposed at the rear portion of the body frame 3. A seat 6 is disposed on the body frame 3. The rider sits on the seat 6 while operating a handlebar 7 and driving the motorcycle.

The front fork 2 is an inverted type front fork formed of a pair of left and right front suspensions 8 and 9. The front suspensions 8 and 9 are supported by an upper bracket 10 and an under bracket 11 on the body frame 3 through an unillustrated steeling shaft and a head pipe. The front suspensions 8 and 9 absorb shock from the front wheel 1 and attenuate the vibration thereof.

The rear suspension 4 has a swing arm 13 on which the rear wheel 5 is axially supported and which is supported by a pivot 12 on the body frame 3, a rear cushion unit 14 supported at its upper end on the body frame 3 and its lower end on the swing arm 13 through a link mechanism (not shown). The rear cushion unit 14 absorbs up-down swinging of the swing arm 13 on the pivot 12 to attenuate the vibration of this motion and to thereby reduce shock from the rear wheel 5.

Hydraulic jacks 50 and 49 described later are formed on the front suspensions 8 and 9 and the rear cushion unit 14, respectively, and a body height adjusting unit 15 is disposed in the vicinity of the rear cushion unit 14. The hydraulic jacks 50 of the front suspensions 8 and 9 and the body height adjusting unit 15 are connected by motorcycle front side hydraulic hoses 16 while the hydraulic jack 49 of the rear cushion unit 14 and the body height adjusting unit 15 are connected by a motorcycle rear side hydraulic hose 17, thereby forming a body height adjustor 18. A hose connector 19 is provided in the line of the motorcycle front side hydraulic hoses 16.

In FIG. 1, a symbol 20 designates a front fender, a symbol 21 a head lamp housing, a symbol 22 a seat rail on the body frame 3, a symbol 23 a sidestand, a symbol 24 an engine, and a symbol 25 an exhaust pipe connected to the engine 24.

Figure 2:
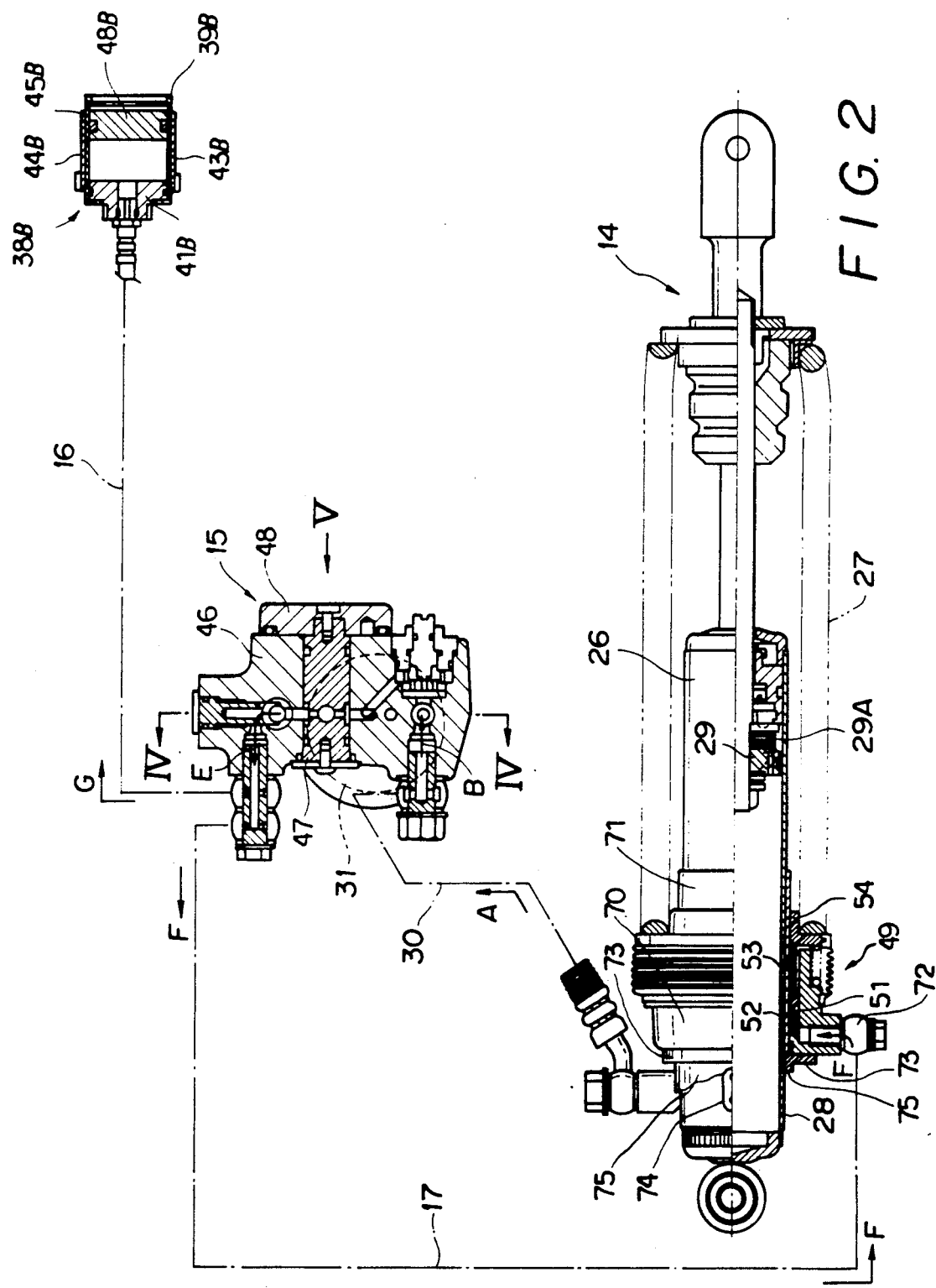
FIG. 2 is a cross sectional view of a rear cushion unit and the body height adjusting unit together with associated members.

As shown in FIG. 2, in the rear cushion unit 14, a coil spring 27 is wound around a rear oil damper 26. The rear oil damper 26 rapidly attenuates the vibration of the coil spring 27 by the resistance to a hydraulic fluid, i.e. pressure oil, contained its cylinder 28 which resistance is caused when the pressure oil flows through small holes of a piston 29 and a valve 29A. For control of the quantity of pressure oil in the cylinder 28, the interior of the cylinder 28 communicates with an oil chamber 32 of a reserve tank 31 shown in FIGS. 4 and 5 through a connection hose 30 and an oil passage of the body height adjusting unit 15. The interior of the reserve tank 31 is sectioned by a piston 33 into the oil chamber 32 and an air chamber 34. The reserve tank 31 is integrally fixed to an adjusting unit body 46 of the body height adjusting unit 15 by screwing or the like.

Each of the front suspensions 8 and 9 shown in FIG. 3 is constituted by an inner tube 35 supported on the front wheel 1 and an outer tube 36 incorporating a front oil damper. The front oil damper rapidly attenuates the vibration of a spring 37 disposed in the inner tube 35.

Figure 6:
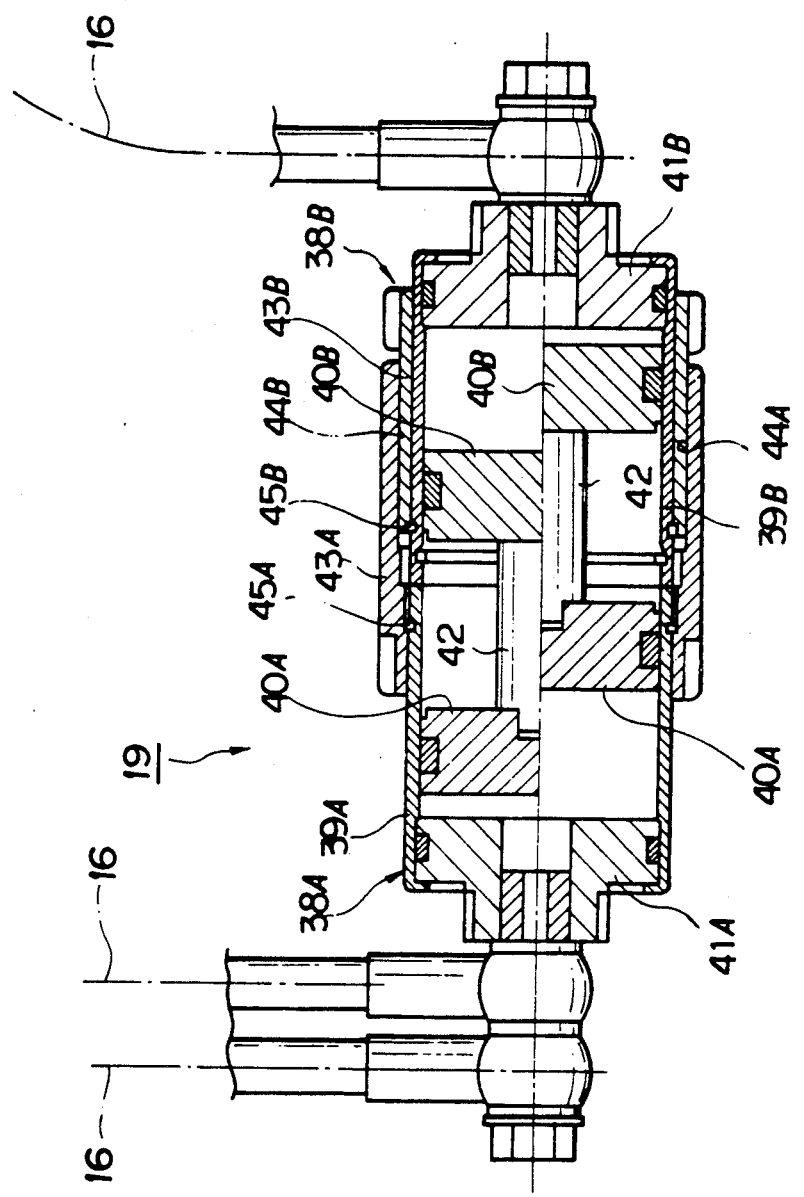
FIG. 6 is a cross sectional view of the hose connector shown in FIG. 1.

As shown in FIGS. 2, 3, and 6, the hose connector 19 provided for the motorcycle front side hydraulic hoses 16 is constituted by a joint 38A on the front fork side and a joint 38B on the body height adjusting unit side.

The joints 38A and 38B have cylinders 39A and 39B in which pistons 40A and 40B are provided, and hose connecting members 41A and 41B fixed to ends of the cylinders 39A and 39B. Two motorcycle front side hydraulic hoses 16 are connected to the hose connecting member 41A of the front fork side joint 38A and to the front suspensions 8 and 9. One motorcycle front side hydraulic hose 16 is connected to the hose connecting portion 41B of the joint 38B on the body height adjusting unit side and is connected to the body height adjusting unit 15. A push rod 42 is fixed to the piston 40A.

Outer cylinders 43A and 43B are loosely fitted to the outer peripheral surfaces of the cylinders 39A and 39B. The joint 38A on the front fork side and the joint 38B on the body height adjusting unit side are connected by screwing of female threads 44A and 44B respectively formed on the outer cylinders 43A and 43B. When this connection is established, the outer cylinders 43A and 43B are respectively stopped by rings 45A and 45B, and the push rod 42 abuts against the piston 40B. Consequently, as the hydraulic pressure of the pressure oil in the cylinders 39A and 39B varies the pistons 40A and 40B are integrally moved by being linked to each other by the push rod 42.

Figure 5:
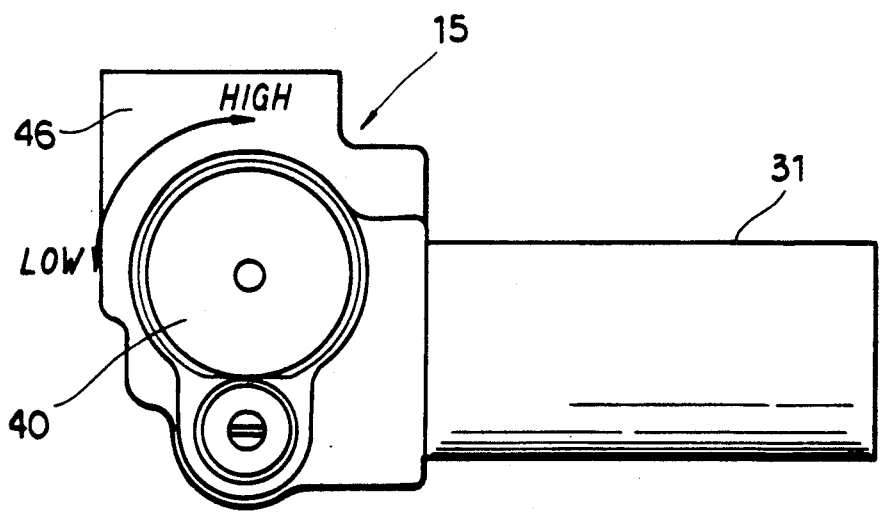
FIG. 5 is a cross sectional view taken along the line V—V shown in FIG. 2.

As shown in FIGS. 2 and 6, the body height adjusting unit 15 of the body height adjustor 18 has a spool valve 47 in the form of a body height changeover valve and which is rotatably disposed at the center of an adjusting unit body 46. The adjusting operation member 48 shown in FIG. 5 is integrally connected to the spool valve 47. The spool valve 47 is changed over by the operation of rotating the adjusting operation member 48 to a high side to increase the body height or to a low side to reduce the body height.

Figure 4:
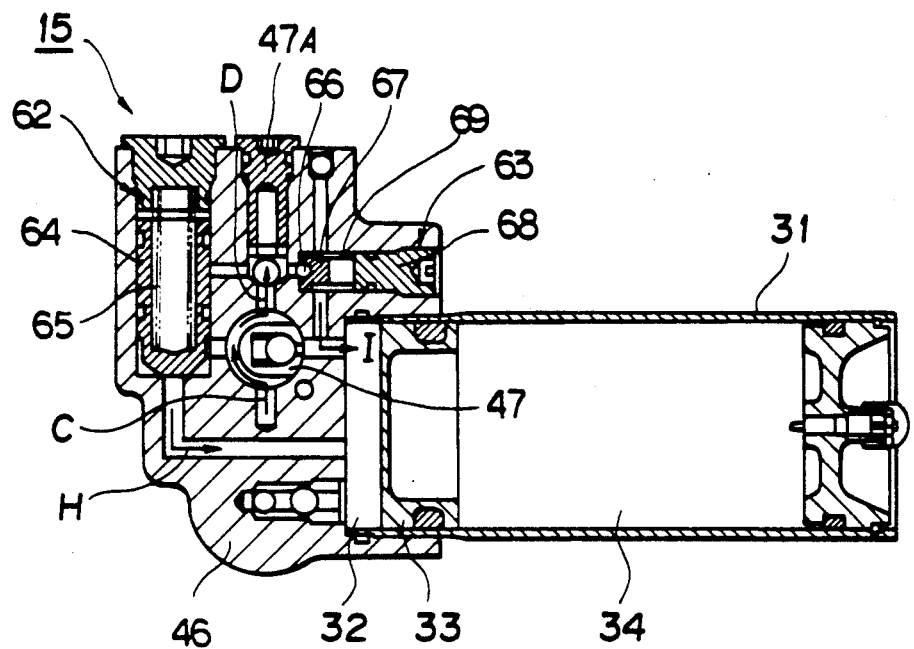
FIG. 4 is a cross sectional view taken along the line IV—IV shown in FIG. 2.

That is, when the spool valve 47 is changed over to the high side by the operation of the adjusting operation member 48, the piston 29 in the oil damper 26 shown in FIG. 2 is moved upward and downward by swinging of the swing arm 13, so that the pressure oil contained in the cylinder 28 flows as indicated by the arrows A and B, the arrows C and D shown in FIG. 4 and the arrow E shown in FIG. 2, and flows into the hydraulic jack 49 of the rear cushion unit 14 through the motorcycle rear side hydraulic hose 17, as indicated by the arrow F. The pressure oil flowing as indicated by the arrow E in the body height adjusting unit 15 also flows into the joint 38B of the hose connector 19 on the body height adjusting unit side through the motorcycle front side hydraulic hoses 16, as indicated by the arrow G. The hydraulic pressure of this pressure oil is transmitted to the hydraulic jacks 50 of the front suspensions 8 and 9 via the joint 38A on the front fork side shown in FIG. 3.

The hydraulic jack 49 has, as shown in FIG. 2, a jack piston 52 disposed inside a jack cylinder chamber 51. The extent of movement of the jack piston 52 is transmitted to a spring guide 54 through a spacer 53 to change the initial load on the spring 27. Accordingly, as the pressure oil flows into the jack cylinder chamber 51 of the hydraulic jack 49 from the body height adjusting unit 15, the jack piston 52 is moved to press the spring guide 54 downward, and the rear cushion unit 14 is thereby extended to increase the body height.

Each of the hydraulic jacks 50 of the front suspensions 8 and 9 has, as shown in FIG. 3, a jack piston 56 disposed inside a jack cylinder chamber 55 formed in the outer tube 36. The extent of movement of the jack piston 56 is transmitted to a spring guide 60 through a plunger 57, a ring 58 and a spacer 59. The two motorcycle front side hydraulic hoses 16 are connected to fork caps 61 of the left and right front suspensions to introduce the pressure oil contained in the motorcycle front side hydraulic hoses 16 into the jack cylinder chambers 55. Consequently, when the hydraulic pressure of the pressure oil is transmitted to each hydraulic jack 50 through the hose connector 19, the jack piston 56 is moved downward and the spring guide 60 thereby depresses the spring 37 to increase the initial load on the spring 37, so that the front suspensions 8 and 9 are extended and hence, the body height is increased.

The body height is set to a high position by simultaneous extension of the rear cushion unit 14 and the front suspensions 8 and 9 based on simultaneous operation of the hydraulic jacks 49 and 50.

To set the body height to a low position, the adjusting operation member 48 is rotated to change over the spool valve 47 to the low side. Then the pressure oil in the hydraulic jack 49 of the rear cushion unit 14 (refer to FIG. 2) is returned to the oil chamber 32 of the reserve tank 31 via the motorcycle rear side hydraulic hose 17 and the oil passage in the body height adjusting unit 15 by the weight of the motorcycle body. Also, the pressure oil in each of the hydraulic jacks 50 of the front suspensions 8 and 9 (refer to FIG. 3) is returned to the joint 38A of the hose connector 19 on the front fork side by the weight of the motorcycle body. The pressure oil in the joint 38B on the body height adjusting unit side is thereby returned to the oil chamber 32 of the reserve tank 31 through the body height& adjusting unit 15. The initial loads on the coil spring( 27 of the rear cushion unit 14 and the coil springs 37 of the front suspensions 8 and 9 are thereby reduced so that the rear cushion unit 14 and the front suspensions 8 and 9 are contracted simultaneously, thereby setting the body height to the low position.

In the adjusting unit body 46, first blow valve 62 and a second blow valve 63 are provided as shown in FIG.

4. The first blow valve 62 has a piston 64 and a spring 65 for urging the piston 64. In the first blow valve 62, the piston 64 moves upward against the urging force of the spring 65 to discharge a part of the pressure oil into the oil chamber 32 of the reserve tank 31, as indicated by the arrow H, if the pressure of the pressure oil flowing into the body height adjusting unit from the rear oil damper 26 via the connection hose 30 (refer to FIG. 2) becomes equal to or higher than a predetermined pressure at the time of changeover of the spool valve 47 to the high side.

In the second blow valve 63, a ball 66 is loosely fitted in a push piece 67, and a spring 69 is provided between the push piece 67 and a spring guide 68. The spring guide 69 is screwed into the adjusting unit body 46. If the motorcycle jumps during running in a state where the spool valve 47 is in the high changeover position and if the hydraulic pressure of the pressure oil in the hydraulic jack 49 of the rear cushion unit 14 and that of the pressure oil in the hydraulic jacks 50 of the front suspensions 8 and 9 are thereby increased, the ball 66 moves against the urging force of the spring 69 so that the pressure oil in the motorcycle front side hydraulic hoses 16 and the motorcycle rear side hydraulic hose 17 are returned to the oil chamber 32 of the reserve tank 31, as indicated by the arrow I, thereby preventing the hydraulic hoses 16 and 17 from being damaged.

If the stroke change on the rear wheel axis caused by the changeover of the body height from the high position to the low position or from the low position to the high position is $R_x$, and if the stroke change on the front wheel axis caused by the same changeover is $f_x$, the difference x between the stroke changes on the front and rear wheel axes is expressed by $$X = \sqrt{(f_x - R_x) \times (R_x - f_x)} .$$

Let the wheel base (i.e. a distance between the axes of the front and rear wheels) and the head lamp height of the motorcycle in the high body height state be L and H, respectively. Then the diameters of the hydraulic jacks 49 and 50 are set so that $$X \leq \frac{LH}{5 \times 10} .$$

is established.

According to the embodiment described above, the adjusting operation member 48 of the body height adjusting unit 15 is rotated to change over the spool valve 47 to the high side when the motorcycle travels on a rough ground or the like. The pressure oil in the rear cushion unit 14 is thereby supplied in a pressurized state to the hydraulic jack 49 of the rear cushion unit 14 and to the hydraulic jacks 50 of the front suspension units 8 and 9 via the body height adjusting unit 15 to increase the lengths of the rear cushion unit 14 and the front suspension units 8 and 9, thereby increasing the body height and, hence, the road clearance. For traveling on an urban road or the like, the spool valve 47 of the body height adjusting unit 15 is changed over to the low side to discharge the pressure oil in the hydraulic jacks 49 and 50 and to thereby reduce the lengths of the rear cushion unit 14 and the front suspension units 8 and 9. The body height is thereby reduced so that the ground can be easily reached by the rider's feet.

Since the adjustor is constructed so that the diameters of the hydraulic jacks 49 and 50 satisfy $$X \leq \frac{LH}{5 \times 10} .$$

the headlamp beam center position can be set within a suitable allowable range of 4/5 the height H on the ground to the height H at an irradiation position 70 located in front of the headlamp 21 attached to the front fork 10 and at a distance of 10 m from the same as shown in FIG. 1 when the body height is changed over to the high or low position. Consequently, the change in the headlamp beam angle can be limited at the time of changeover of the body height to the high or low position.

Figure 7A:
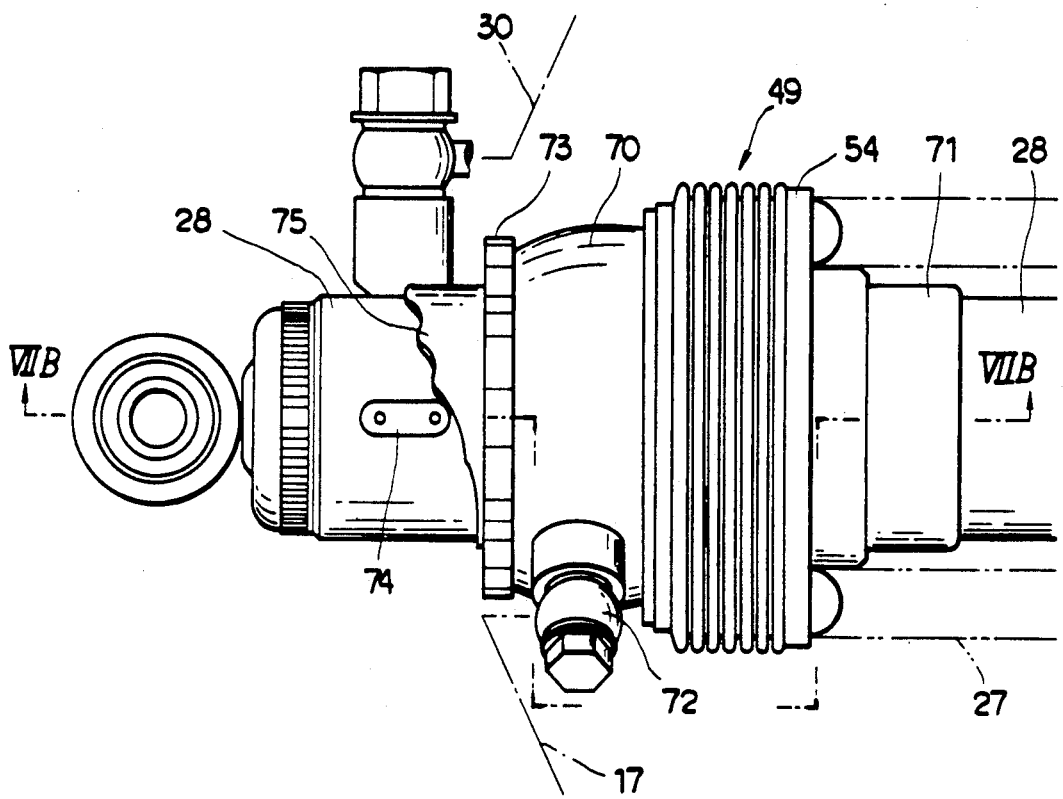
FIG. 7A is a partial view in an enlarged scale of FIG. 2.
Figure 7B:
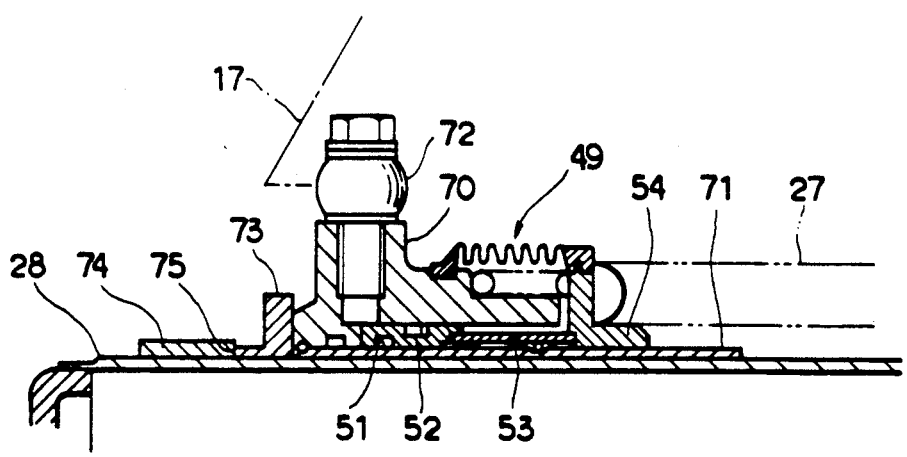
FIG. 7B is a sectional view taken along the line VIIB—VIIB shown in FIG. 7A, partially eliminated.

In another aspect of this invention, referring to FIGS. 7A and 7B, which are enlarged views of a part of FIG. 2 showing the hydraulic jack 49, a jack piston 52 is disposed in a jack cylinder chamber 51, and the jack piston 52 presses a spring guide 54 via a spacer 53. The jack cylinder chamber 51 is defined by being enclosed by first and second hydraulic jack bodies 70 and 71. The first hydraulic jack body 70 is fixedly mounted on the second hydraulic jack body 71 and a hose joint 72 of the hydraulic hose 17 on the motorcycle rear side is connected to the first hydraulic jack body 70. The second hydraulic jack body 71 is fitted into the cylinder 28 of the rear oil damper 26 to be movable in the axial direction of the cylinder 28. The spring guide 54 is disposed on the second hydraulic jack body 71 to be slidable in the axial direction of the cylinder 28.

A spring adjuster 73 and a cam slider 74 are mounted to the cylinder 28, and the cam slider 74 is secured to the cylinder 28. The spring adjuster 73 is idly fitted to the cylinder 28 so that the spring adjuster 73 can be rotated about the outer periphery of the cylinder 28 in a state contacting to the end face of the first hydraulic jack body 70. A cam surface 75 is formed to the spring adjuster 73 so that the cam surface 75 always abuts against the cam slider 74. Accordingly, when the spring adjuster 73 is rotated in the outer peripheral direction of the cylinder 28, the cam surface 75 abuts against the cam slider 74 to thereby move the first and second hydraulic jack bodies 70 and 71 in the axial direction of the cylinder 28, thus changing the initial load of the spring 27.

According to this aspect of the present invention, the first and second hydraulic jack bodies 70 and 71 are finely or minutely moved in the axial direction of the cylinder 28 by the operation of the cam slider 74 and the cam surface 75 of the spring adjuster 73 in accordance with the rotation of the spring adjuster 73 about the outer peripheral direction of the cylinder 28, whereby the initial load of the spring 27 can be changed. As a result, in response to the switching operation of the spool valve 47, the hydraulic oil from the hydraulic hose on the rear side of the motorcycle body is supplied or discharged and the initial load of the coil spring 27 is changed by the utilization of the jack piston 52 to thereby change the body height to the high or low position. Thereafter, according to the rotation of the spring adjuster 73, the high or low position is further finely adjusted. Accordingly, the body height adjustment in conformity with the sizes or attitudes of all the riders can be realized and the geometry can be also changed, so that the operation stability can be changed in accordance with the desires of the riders.

In the described embodiment, the cam surface 75 of the spring adjuster 73 is engaged with the cam slider 74 so as to slide the first and second hydraulic jack bodies 70 and 71 in the axial direction of the cylinder 28. In an alternation, spring adjuster 73 may be screw engaged with the cylinder 28 without locating the cam slider 74 and the cam surface 75 and in accordance with the screw engagement therebetween, the first and second hydraulic jack bodies 70 and 71 may be slid in the axial direction thereof.

In a further aspect of this invention, the embodiment of FIG. 3 may be substituted with an embodiment shown in FIG. 8 in which a spring means 81 is disposed in the jack cylinder chamber 55.

Figure 9:
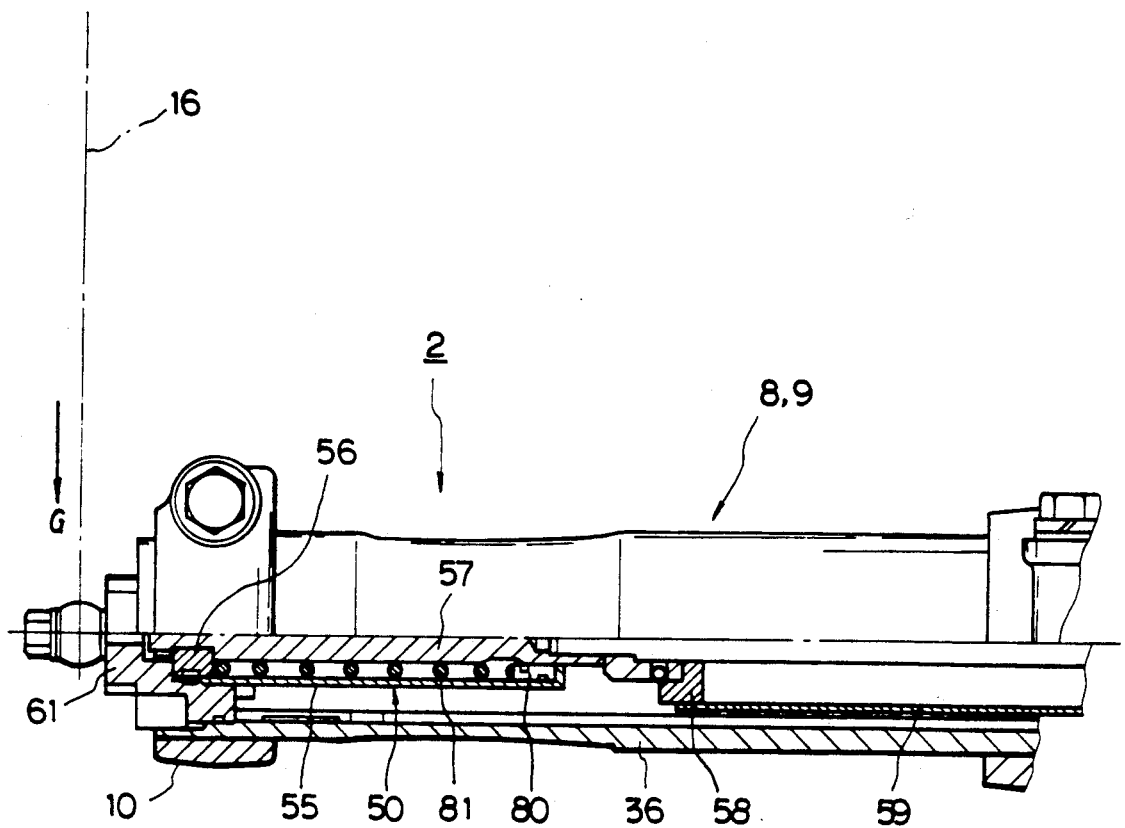
FIG. 9 is a partial view in an enlarged scale of FIG. 8.

Referring to FIGS. 8 and 9, a stopper member 80 is disposed in the jack cylinder chamber 55 at the end portion thereof opposite to the side of the location of the fork cap 61. A return spring 81 as an urging member is also disposed between the stopper member 80 and the jack piston 56. The urging force of the return spring 81 acts in a direction reverse to that in which the hydraulic pressure of the hydraulic oil guided into the jack cylinder chamber 55 from the hydraulic hose 16 on the front side of the motorcycle body acts on the jack piston 56. Accordingly, when the hydraulic pressure of the hydraulic oil is transmitted to the hydraulic jack 50 through the hose connector 19, the jack piston 56 is moved downwardly against the urging force of the return spring 81, the spring guide 60 depresses the spring downwardly and the initial load of the spring 37 is increased, whereby the front suspensions 8 and 9 are expanded, resulting in the increase of the body height.

On the contrary, in a case where it is required to lower the body height, the adjusting, operation member 48 is rotated to change over the spool valve 47 to the low side (the spool valve 47 is rotated counterclockwise by 90° from the position shown in FIG. 4). The pressure oil in the hydraulic jack 49 of the rear cushion unit. 14 is returned to the oil chamber 32 of the reserve tank 31 via the motorcycle rear side hydraulic hose 17 and the oil passage in the body height adjusting unit 5 by the weight of the motorcycle body. The jack piston 56 disposed in the hydraulic jack 50 of the front suspensions 8 and 9 moves towards the fork cap side by the weights of the motorcycle body and the rider and the urging force of the return spring 81. Therefore, the hydraulic oil in the hydraulic jack 50 returns to the joint portion 38A on the side of the front fork of the hose connector 19. According to this operation, the hydraulic pressure of the joint portion 38B on the side of the body height adjustor returns in the oil chamber 32 of the reserve tank 31 via the body height adjusting unit 15. Accordingly, the initial loads of the coil spring 27 of the rear cushion unit 14 and the spring 37 of the front suspensions 8 and 9 are lowered, whereby the rear cushion unit 14 and the front suspensions 8 and 9 are contracted, resulting in the decrease of the body height. The other structures and the operations of the front suspensions 8 and 9 shown in FIG. 8 are substantially equal to those of the embodiment shown in FIG. 3.

According to this embodiment, when the spool valve 47 is switched to the low position side and the hydraulic oil in the jack cylinder chamber 55 of the hydraulic jack 50 of the front suspensions 8 and 9 is indirectly guided in the oil chamber 32 of the reserve tank 31, the piston 56 is moved towards the fork cap side by the urging force of the return spring 81 in addition to the weights of the motorcycle body and the rider. At this time, the hydraulic oil in the hydraulic jack 50 returns to the joint portion 38A on the side of the front fork of the hose connector 19. According to this operation, the hydraulic pressure of the joint portion 38B on the side of the body height adjustor returns in the oil chamber 32 of the reserve tank 31 via the body height adjusting unit 15. The hydraulic pressure acts in the direction opposing to that of the urging force of the return spring 81 with respect to the jack piston 56. Accordingly, in a case where the load distribution for the front wheel is lowered, the expansion of the front suspensions 8 and 9 can be prevented by the location of the return spring 81. Consequently, the low position of the front suspensions 8 and 9 can be surely maintained, thus achieving the running stability of the motorcycle.

In addition, according to the arrangement of the return spring 81, when the spool valve 47 of the body height adjusting unit 15 is changed to the low position side, the front suspensions 8 and 9 and the rear cushion unit 14 can be simultaneously retracted by the urging force of the return spring 81, whereby the lowering of the body height at the body height changing time to the low position can be instantaneously sensed by the rider, thus improving the characteristics of the body height adjustor of the motorcycle.

It is to be understood that this invention is not limited to the described embodiments and many other changes and modifications thereof may be made without departing from the scopes of the appended claims.

What is claimed is:

1. A motorcycle having a body adjustable in height, comprising:
    a pair of extendable front suspensions mounted to a front fork supported rotatably by a frame of a motorcycle body, said front fork supporting a front wheel in a shock absorbing manner, said front fork being equipped with a head lamp;
    an extendable rear cushion unit supported by the body frame, said rear cushion unit supporting a rear wheel in a shock absorbing manner;
    an engine unit mounted to the body frame to drive and rotate the rear wheel; and
    a body height adjustor capable of adjusting the body height of the motorcycle by changing lengths of said front suspensions and said rear cushion unit, said body height adjustor including,
    first hydraulic jack means for extending and retracting said front suspensions;
    second hydraulic jack means for extending and retracting said rear cushion unit; and
    a body height adjusting unit for transmitting hydraulic pressure of hydraulic fluid in said rear cushion unit to said first and second hydraulic jack means through hydraulic hoses to thereby change the body height in a high or low position thereof, wherein a following equation is satisfied, $$X \leq LH/5 \times 10$$

where
    X: difference between stroke changing quantities on an axis of the front wheel and an axis of the rear wheel;
    L: distance between axes of the front and rear wheels, so called wheel base; and
    H: height of the head lamp from a ground base.

2. A motorcycle having a body adjustable in height, comprising:

a pair of extendable front suspensions mounted to a front fork supported rotatably by a frame of a motorcycle body, said front fork supporting a front wheel in a shock absorbing manner;

an extendable rear cushion unit supported by the body frame, said rear cushion unit supporting a rear wheel in a shock absorbing manner;

an engine unit mounted to the body frame to drive and rotate the rear wheel; and a body height adjustor capable of adjusting the body height of the motorcycle by changing lengths of said front suspensions and said rear cushion unit, said body weight adjustor including, first hydraulic jack means for extending and retracting said front suspensions;

second hydraulic jack means for extending and retracting said rear cushion unit; and a body height adjusting unit for transmitting hydraulic pressure of hydraulic fluid in said rear cushion unit to said first and second hydraulic jack means through hydraulic hoses, said rear cushion unit being provided with a rear oil damper having an outer periphery to which said second hydraulic jack means is mounted and provided with a spring means against which said second hydraulic jack means abuts, said spring means having an initial load changed by hydraulic pressure of the hydraulic oil in said rear cushion unit and said second hydraulic jack means being movable in a direction towards said spring means with respect to said rear oil damper to change the initial load of the spring means.

3. A motorcycle according to claim 2, wherein said spring means is a coil spring.

4. A motorcycle according to claim 1, wherein said second hydraulic jack means comprises a first body and a second body on which said first body is mounted, said second hydraulic jack means including a jack cylinder chamber defined by said first and second bodies and a jack piston incorporated in said jack cylinder chamber, said second body being fitted to said rear oil damper to be axially slidable.

5. A motorcycle according to claim 4, wherein said oil damper is provided with a cylinder to which a spring adjustor and a cam slider are attached, said spring adjustor being idly mounted to said cylinder of the oil damper so as to rotate around an outer periphery of the cylinder in contact to an end face of said first body of the second hydraulic jack means, said spring adjustor being provided with a cam surface abutting against said cam slider.

6. A motorcycle having a body adjustable in height, comprising:

a pair of extendable front suspensions mounted to a front fork supported rotatably by a frame of a motorcycle body, said front fork supporting a front wheel in a shock absorbing manner and having an upper bracket mounted thereto;

an extendable rear cushion unit supported by the body frame, said rear cushion unit supporting a rear wheel in a shock absorbing manner;

an engine unit mounted to the body frame to drive and rotate the rear wheel; and a body height adjustor capable of adjusting the body height of the motorcycle by changing lengths of said front suspensions and said rear cushion unit, said body height adjustor including, first hydraulic jack means for extending and retracting said front suspensions;

second hydraulic jack means for extending and retracting said rear cushion unit; and a body height adjusting unit for transmitting hydraulic pressure of hydraulic fluid in said rear cushion unit to said first and second hydraulic jack means through hydraulic hoses, said first hydraulic jack means being provided with a cylinder chamber, a piston incorporated in the cylinder chamber and an urging means disposed between an end portion of said cylinder chamber and said piston so as to urge said piston in a direction opposite to a direction of hydraulic pressure applied by hydraulic fluid.

7. A motorcycle according to claim 6, wherein said urging means is a return spring.

* * * * *